US011082205B2

(12) United States Patent
Bridges et al.

(10) Patent No.: US 11,082,205 B2
(45) Date of Patent: Aug. 3, 2021

(54) METHODS FOR SECURING DATA

(71) Applicant: PaperClip Inc., Hackensack, NJ (US)

(72) Inventors: David Michael Bridges, Toms River, NJ (US); William Weiss, Hackensack, NJ (US)

(73) Assignee: Paperclip Inc., Hackensack, NJ (US)

( * ) Notice: Subject to any disclaimer, the term of this patent is extended or adjusted under 35 U.S.C. 154(b) by 394 days.

(21) Appl. No.: 16/242,694

(22) Filed: Jan. 8, 2019

(65) Prior Publication Data

US 2020/0228322 A1 Jul. 16, 2020

Related U.S. Application Data

(60) Provisional application No. 62/614,826, filed on Jan. 8, 2018.

(51) Int. Cl.
*H04L 9/06* (2006.01)
*H04L 9/08* (2006.01)
*H04L 9/32* (2006.01)

(52) U.S. Cl.
CPC ............ *H04L 9/0643* (2013.01); *H04L 9/085* (2013.01); *H04L 9/0822* (2013.01); *H04L 9/0869* (2013.01); *H04L 9/3297* (2013.01)

(58) Field of Classification Search
CPC ..... H04L 9/0643; H04L 9/0822; H04L 9/085; H04L 9/0869; H04L 9/3297; H04L 9/0894; H04L 9/3236; H04L 9/0872; H04L 9/0891; G06F 21/6245
See application file for complete search history.

(56) References Cited

U.S. PATENT DOCUMENTS

| | | | |
|---|---|---|---|
| 5,832,100 A | 11/1998 | Lawton et al. | |
| 6,043,819 A | 3/2000 | LeBrun et al. | |
| 9,652,688 B2 | 5/2017 | Jean et al. | |
| 2002/0194213 A1 | 12/2002 | Takayanagi | |
| 2003/0033537 A1* | 2/2003 | Fujimoto | G06F 21/123 |
| | | | 713/193 |
| 2003/0140306 A1 | 7/2003 | Robinson | |
| 2005/0036681 A1 | 2/2005 | Lenoir | |
| 2006/0190489 A1 | 8/2006 | Vohariwatt et al. | |
| 2008/0155540 A1 | 6/2008 | Mock et al. | |
| 2009/0313483 A1* | 12/2009 | Ranade | H04L 9/0894 |
| | | | 713/193 |
| 2011/0078570 A1 | 3/2011 | Larsen et al. | |
| 2013/0276074 A1 | 10/2013 | Orsini et al. | |

(Continued)

OTHER PUBLICATIONS

International Report on Patentability dated Jul. 23, 2020 from International (PCT) Patent Application No. PCT/US2019/012694, 9 pages.

(Continued)

*Primary Examiner* — Nelson S. Giddins
(74) *Attorney, Agent, or Firm* — Ohlandt, Greeley, Ruggiero & Perle, L.L.P.

(57) ABSTRACT

A method for securely processing data to prevent unauthorized access is provided. The method includes the steps of splitting data into components and with a sequence of a first hashing, a first encryption, a second hashing, a second encryption, and a third hashing, that optimizes the security of the data. The method further provides steps to securely retrieve, update and delete the data once the data has been securely stored.

20 Claims, 14 Drawing Sheets

SaaS Deployment

(56) References Cited

U.S. PATENT DOCUMENTS

| | | |
|---|---|---|
| 2014/0013452 A1* | 1/2014 | Aissi .................. G06F 21/85 726/30 |
| 2014/0297346 A1 | 10/2014 | Mock et al. |
| 2016/0171298 A1 | 6/2016 | Takeda et al. |
| 2016/0171513 A1 | 6/2016 | Takeda et al. |
| 2016/0253504 A1 | 9/2016 | Chen et al. |
| 2017/0255840 A1 | 9/2017 | Jean et al. |

OTHER PUBLICATIONS

Chen et al., U.S. Appl. No. 62/126,124, filed Feb. 27, 2015 titled "Electronically Shredding a Document".
International Search Report dated May 1, 2019 from International (PCT) Patent Application No. PCT/US2019/012694, 5 pages.
Written Opinion dated May 1, 2019 from International (PCT) Patent Application No. PCT/US2019/012694, 14 pages.

\* cited by examiner

Figure 9.

| Production SQL Relational Data Base | | | | |
|---|---|---|---|---|
| Account Number | First Name | Last Name | SSN | DOB |
| I1 | V2 | V1 | V4 | V3 |
| ABCD1235 | Mike | Brown | | |
| ABCD1234 | Scott | Smith | 123-45-6788 | 11/12/1968 |
| ABCD1236 | Tom | Walsh | 123-45-6791 | 05/22/1970 |
| ABCD1237 | Mike | Bridges | 123-45-6792 | 05/22/1971 |

Figure 10.

| Production SQL Relational Data Base (P1) | | | | | | |
|---|---|---|---|---|---|---|
| SDS Mapping | SQL Field Header | Account Number | Last Name | First Name | DOB | SSN |
| Column Position | | I1 | V1 | V2 | V3 | V4 |
| Row Position | R2 | ABCD1235 | SDS | Mike | 01/01/1900 | 000-00-0000 |
| | R3 | ABCD1234 | SDS | Scott | 01/01/1900 | 000-00-0000 |
| | R4 | ABCD1236 | SDS | Tom | 01/01/1900 | 000-00-0000 |
| | R5 | ABCD1237 | SDS | Mike | 01/01/1900 | 000-00-0000 |

Figure 11A.

| ARCHIVE Table | | |
|---|---|---|
| SDS2-H ID | SDS2 Value | SDS2 Salt |
| H-301 | ABCD | 2L3M2CNi |
| H-302 | 1235 | uTEVbVz8 |
| H-303 | Suleski | X7F0QEnp |
| H-304 | Mike | eNcW4B53 |
| H-305 | 1017 | 7k4toK7D |
| H-306 | 1969 | tGlVHNsU |
| H-307 | 123 | I5ER3xC7 |
| H-308 | 45 | xY7pt7ts |
| H-309 | 6790 | nUe7gFUM |

Figure 11B.

ARCHIVE TABLE

| SDS2-Hash ID | SDS2 Plaintext Value |
|---|---|
| WHauJ3WfSRF18abz4CkwJ5b4URy98bU | ABCD |
| FeRxt3AVclzRzCyJXqiFjgBbpfa2FWh0 | 1235 |
| G5vdIoFACOTBGKFRcoIR3Gjjd0HOclQF | Suleski |
| I8K3QUBtkhCVMAVfaIZavP6AWMASg1i3 | Mike |
| 8NZH9MAIn2rWDOXcfIxUtzUWCKgETtMt | 1017 |
| 9JW8kNgOHQx2ij6Izhw5ENKI2DFyp6y4 | 1969 |
| p8X41Y1RFjMcCbycNYPv6Rpv8OFhIriL | 123 |
| b2NkMCQapfzeBsGaPnIQqC8YTm5nSUIX | 45 |
| AAAJOOPLHyGabKtQHoSfGSeY4zRjGnIV | 6790 |

Figure 12A.

CONTEXT Table

| SDS1-H ID | SDS1 Key Value |
|---|---|
| H-200 | P1R2I1_H-301_P1R2V1_H-303_P1R2V2_H-304_P1R2V3_H-305_P1R2V4_H-307_H-308_H-309_00000_TimeStamp |

Figure 12B.

CONTEXT TABLE

| SDS1-Hash ID | SDS1 Encrypted Key Value |
|---|---|
| mYrhFLgEebRt5LY0I6sRgZKsJm7hoOwt | 6pAdCsR9qv63xMqCREX6pLGMO8XcN9ZQ |
| phxQK5x3ptIucQ4765Qj0zEujxODUywr | WqOQYZ1VReR5kVu7DagSt0ZzdDrWqti0 |
| 64YwCoigD4SWhIJNDQA4Sd7fQYwVsfph | 5b8q77SZ19PyiDSV3dSatoid62fo2Nyi |
| PvaGJdPGVkDTOJ7NGbcPMPxR3ftFbQhn | LqjwmLLZOMEJlOOx4SiaviV98JNntKoE |
| DZHhjKk4PCB9KoqoR6KjsG2mUjyd7hpD | i9FLHqNurnKthWzTcjWx9fW7gfM9VH6r |
| W7aKiegksabE5JE8ueAYL2EDnIpmdOYj | qcWk5ou7CvEjDRBXaOO0Hige2Xhaz4He |
| B1YcxeCGtCVaxe9VGRLO9hcl61riGUIH | okhM3jk5LIGEMGrYYLUit2edZQf5xe9Z |
| 4OvM7xchrQD1aX50JTK59KYvGDxnDoHr | JrK8Ufbksx0cznDBUpweUDaUzAF39zdD |
| IVstM7go1jMMt56dAvSX1nWFQ0IUahk3 | TxUd5TyXJImv1Ok4Dl2OhGLf8mcWyLNT |

Figure 13A.

| TOKEN Table | |
|---|---|
| SDS0-H ID | SDS0-Key Value |
| H-200A | H-200 |

Figure 13B.

| TOKEN Table | |
|---|---|
| SDS0-Hash ID | SDS0-Encrypted Key Value |
| S3brK25ll9Jmn3ZODy9grt0wl17k5RVG | 32GncEidBaaKXx6kkiOE8RNyM5FiEUvT |
| OC2ADSuPvo7KQ7X566MzldD98l72grg5 | A38a2NNNUvauyZ3NE09vEMb0E9I5k88E |
| oX1U0q829wnVwvLuAhIA1B9ZKR8EuK7k | DxgB0znI49o9QRFvFMe516EsocKt89Rz |
| CQZBDoFtBpU3gaH67E8Tz2TFpaxBgFOi | fDOxkUuN29r7bPmLEjJCEFhKDTm27EMB |
| dX0O17OG9CpQUhqKl9dYptw67j825278 | BVx2klgGsVNBfIJR0PPVFEN010gSFbRH |
| 4Ua8I45RTLW6kh1BuLk0ph6O9E0PDiD8 | k65kWYHh9QW8DCCBmCgPSzoWdzFgApN0 |
| ICLDMwo01sdumy2PAML3DN6g3bSVD5IH | W7Ci6hySE3bdkO6C95nZ23rYM4U1dS2G |
| X5eG7Ye20xQex0Fm9VAgM3LRGSWoXikn | 23Py72lny6P0DG9UciunyKattNFoC5eb |
| 1kOkt7quDMMP934dWRha2Q0HmjSCh0DE | qOzSaNnG3pMkKcZ74Ky61FFI0GDJooMN |

Many to Many $$f:(x) = \pm \sqrt{n-x^2}$$

For every (x) value there are two (y) values and for every (y) values there are two (x) values Many Archive or Context Table records can relate
to many Context or Archive Tables records.

METHODS FOR SECURING DATA

CROSS REFERENCE TO RELATED APPLICATIONS

This application claims priority under 35 U.S.C. § 119(e) from U.S. Provisional Patent Application No. 62/614,826 filed on Jan. 8, 2018, the entire contents of which is incorporated herein by reference.

BACKGROUND OF THE DISCLOSURE

1. Field of the Disclosure

The present disclosure relates to methods for securely processing data, preferably confidential data. More particularly, the present disclosure relates to methods for processing data out of context to assure security. In addition, the present disclosure uses a combination of multiple encryption and hashing techniques to further enhance the security of the data.

2. Description of the Related Art

Perfect Secrecy as defined by Dr. Shannon in 1949 simply states that for any given encrypted text, no adversary with unlimited resources could decrypt the text. Dr. Shannon's formula is where C=ciphertext, P=plaintext, and C≠P. In other words, the ciphertext gives no clues as to the plaintext. Today, cryptography is focused on the strength of the key to increase the number of iterations the attacker's code must run. Given today's computing power, many encryption algorithms need 40 years to decrypt. This then leads to the bit size K>C where K=encryption algorithm and C=ciphertext.

Encryption technology is commonly used as perimeter security to protect databases from unauthorized access. This type of security is not enough to prevent unauthorized access, such as attacks performed by cybercriminals. Encryption technology has not proven effective as cybercriminals find ways around perimeter security, since these attacks happen inside the encrypted infrastructure.

Certain types of encryption technology, such as SHA-256, AES-256, MDE-5, 3DES, and Twofish, are commonly used. AES has been adopted by the U.S. government and is now also used worldwide. It supersedes the Data Encryption Standard (DES). Triple DES (3DES), TripleData Encryption Algorithm (TDEA or Triple DEA), is a symmetric-key block cipher, which applies the DES cipher algorithm three times to each data block. Twofish is a symmetric key block cipher with a block size of 128 bits and has key sizes up to 256 bits.

Hashing technology or hashing is a one-way function that cannot be decrypted back to the original value. Hashing algorithms are typically cryptographic in nature, but the principal difference is that encryption is reversible through decryption, while hashing is not. An encryption function usually takes an input and produces an encrypted output that is the same, or slightly larger in size. The SHA (Secure Hash Algorithm) is one of a number of cryptographic hash functions. A cryptographic hash is like a signature for a text or a data file. SHA-256 algorithm generates an almost-unique, fixed size 256-bit (32-byte) hash.

The MD5 algorithm is a widely used hash function producing a 128-bit hash value. Although MD5 was initially designed to be used as a cryptographic hash function, it has been found to have vulnerabilities when used alone. Like most hash functions, MD5 is neither encryption nor encoding.

Today, hackers focus on elevating privileges to achieve unobstructed access to data. Once though the perimeter security, hackers can begin attacks ranging from ransoming data, theft, and destruction. Hackers attack thru Malware operating on a computer's memory and components, and gain access to the next password to hack or encryption to crack. The common theme in cyber security today is not if there will be a breach, but when there will be a breach.

The obvious approach would be to encrypt the database itself. This action would be just as ineffective as perimeter security with an immense negative performance burden. Academia for the past ten years have been working with the concept of Searchable Symmetrical Encryption (SSE), whereby some of the data remains in plain text and the rest is encrypted. The negative to SSE has been its inherit leakage. Leakage is the term relating to access to plain & ciphered text together which will lead to its eventual decryption.

Searchable Symmetrical Encryption (SSE) has the objective to store encrypted data with an untrusted third-party cloud provider and maintain the ability to search on the data. Encrypting every row or field in the database does not work because it cannot be searched. Creators of SSE solutions have concluded that some information helpful to attackers must be used and this is called leakage. Another form of leakage has been the approach to build into the encryption back/trap doors. In either case, the security is considered weak. Several key points of SSE leakage include, the sharing of Keys, plain-text and cipher-text relationships, search patterns are deterministic, and frequency vectors provide query statistic. These SSE schemes have been classified as weak security and do not achieve the above objective. Therefore, for SSE to become viable the leakage must be eliminated.

Thus, there is a need to address the foregoing problems.

SUMMARY OF THE DISCLOSURE

The present disclosure provides a Shredded Data Storage model (SDS) that addresses at least the aforementioned shortcomings of current data security measures, and uses SSE, while achieving Perfect Secrecy best practices to protecting data by eliminating leakage.

Shredded Data Storage (SDS) method has no leakage. SDS does not support any back/trap doors for access. The SDS searching method uses one-way hashing (the search value cannot be reversed from the hash). SDS can regenerate the hash value by preconfigured options of frequency (i.e., Nonce—every time accessed, updates only, number of times viewed, etc.). SDS shredded data produces "many to many" relationships between storage (Archive Table Snip-It) and retrieval requests (Token Table), thereby creating a probabilistic pattern of data access. Current SSE models are "one to one" relationships creating deterministic patterns (probabilistic models incorporate random variables while a deterministic model gives a single possible outcome for an event). Probabilistic patterns of data access dramatically reduce the success of Attacker's ability to crack. SDS can meet the performance requirements of today's computing with ~1 ms overhead.

SDS also provides or achieves the four goals of cryptography, namely Confidentiality, Integrity, Authentication and Nonrepudiation.

The present disclosure further provides such a method in which data is split into components or Snip-Its and with combinations of encryption and hashing to assure security.

The present disclosure yet further provides such a method in which data is split into components or Snip-Its and with a sequence of encryptions and hashings, to enhance security.

The present disclosure still further provides such a method in which data is split into components or Snip-Its and with a sequence of a first hashing, a first encryption, a second hashing, a second encryption, and third hashing, that optimizes security.

The present disclosure also provides such a method in which data is split into components or Snip-Its and provided, out of context, to assure security during processing of the data.

The present disclosure further provides such a method in which the data is assembled into context for transmission to the client or customer, yet is stored elsewhere in an unassembled, and thus out of context state.

The present disclosure yet further provides that SDS is designed to use off the shelf cryptography.

The present disclosure still further provides that the design of SDS allows endusers to select their algorithms and manage their keys.

The present disclosure further provides that SDS will deploy with standard algorithms depending on the industry and the regulations around the data being stored.

The present disclosure provides an SDS design that is capable of supporting multiple algorithms for encryption and hashing.

The present disclosure also provides that such an SDS design is configured to further enhance security because attackers now have to account for more than one cryptography scheme, making many, if not all, of their tools useless.

BRIEF DESCRIPTION OF THE DRAWINGS

FIG. 9 illustrates a typical table found in an SQL database of the present disclosure.

FIG. 10 illustrates a typical table found in an SQL database of the present disclosure, with selected plaintext updated with various values.

FIG. 11A illustrates an embodiment of the archive table of the present disclosure.

FIG. 11B illustrates an embodiment of the archive table of the present disclosure, as it would look in production.

FIG. 12A illustrates an embodiment of the context table of the present disclosure.

FIG. 12B illustrates an embodiment of the context table of the present disclosure, as it would look in production.

FIG. 13A illustrates an embodiment of the token table of the present disclosure.

FIG. 13B illustrates an embodiment of the token table of the present disclosure, as it would look in production.

DESCRIPTION OF EXEMPLARY EMBODIMENTS

Shredded Data Storage model or SDS achieves the four goals of cryptography, namely Confidentiality, Integrity, Authentication and Nonrepudiation.

Confidentiality is achieved through shredding and encryption. The original plaintext value does not exist in stored memory. SDS eliminates the need for ciphertext. Therefore, with SDS, there is no plaintext/ciphertext relationship.

Integrity is achieved through a series of one-way hashing of plaintext values. This ensures that any alterations of shredded or encrypted values will be detected.

Authentication is achieved by SDS. SDS is designed as a child to a Structured Query Language (SQL) Database parent. SDS with its plug & play configuration only has value to its parent, and no other parent.

Nonrepudiation is achieved by SDS, as SDS access via Tokens are transacted as Nonce events and previous Tokens are rendered useless.

Figure 1:
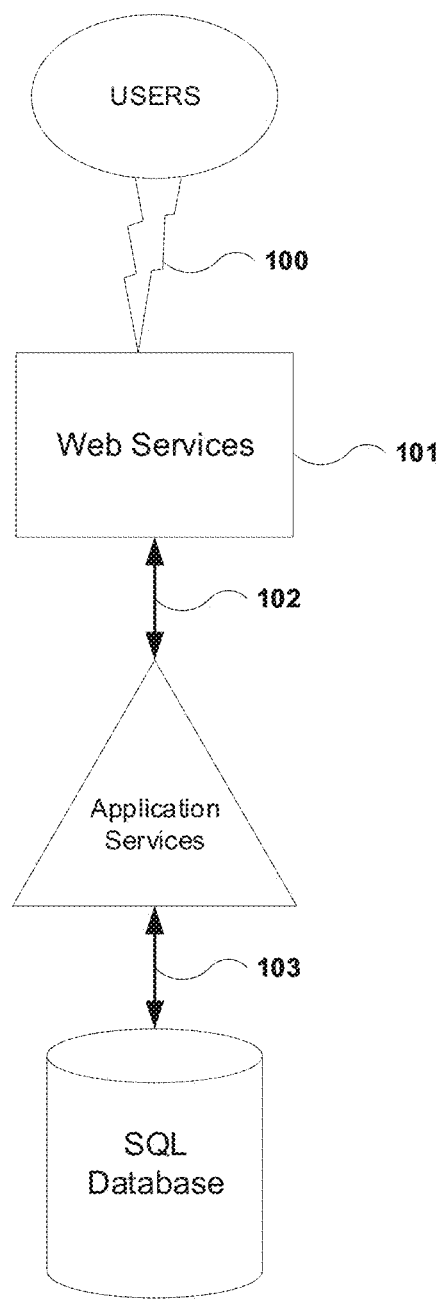
FIG. 1 is a diagram of a typical application deployment representing perimeter security of separate tiers for major components.

Referring to the drawings and, in particular, FIG. 1, a typical application deployment representing perimeter security of separate tiers for major components is shown. Secure internet communications (HIPS) is shown at 100. Typical firewalls tier 1 (DMZ), tier 2 and tier 3 are shown at 101, 102 and 103, respectively.

SDS begins processing data that the user desires to protect. SDS reads the data out of the SQL tables and shreds the data based on the configuration options selected. "SDS AI" is the application engine performing all SDS operations. This engine will be slightly modified depending on the hardware (Cloud/Appliance and the like) and the targeted database (MS SQL, Oracle, and the like).

SDS is designed to plug and play with several SQL Database statements, for example, INSERT, UPDATE and DELETE. The core operations will differ among databases because each database may have special, and in some cases unique, operations and command interceptors that allow for custom transactional isolations. The result is that a normal SQL Database memory transaction is suspended, and waits for SDS to read and return plaintext output and then frees the SQL transaction to complete its output. The SDS process affects the SQL Database record "pagelife expectancy" whereby it is executed after the output (Data Base Record Deleted).

This parent (SQL Database) and child (SDS) relationship is different in the present disclosure. This is because the relationship does not require any database, application or infrastructure changes to implement. In deployment, administration can require two factor authentication.

Figure 2A:
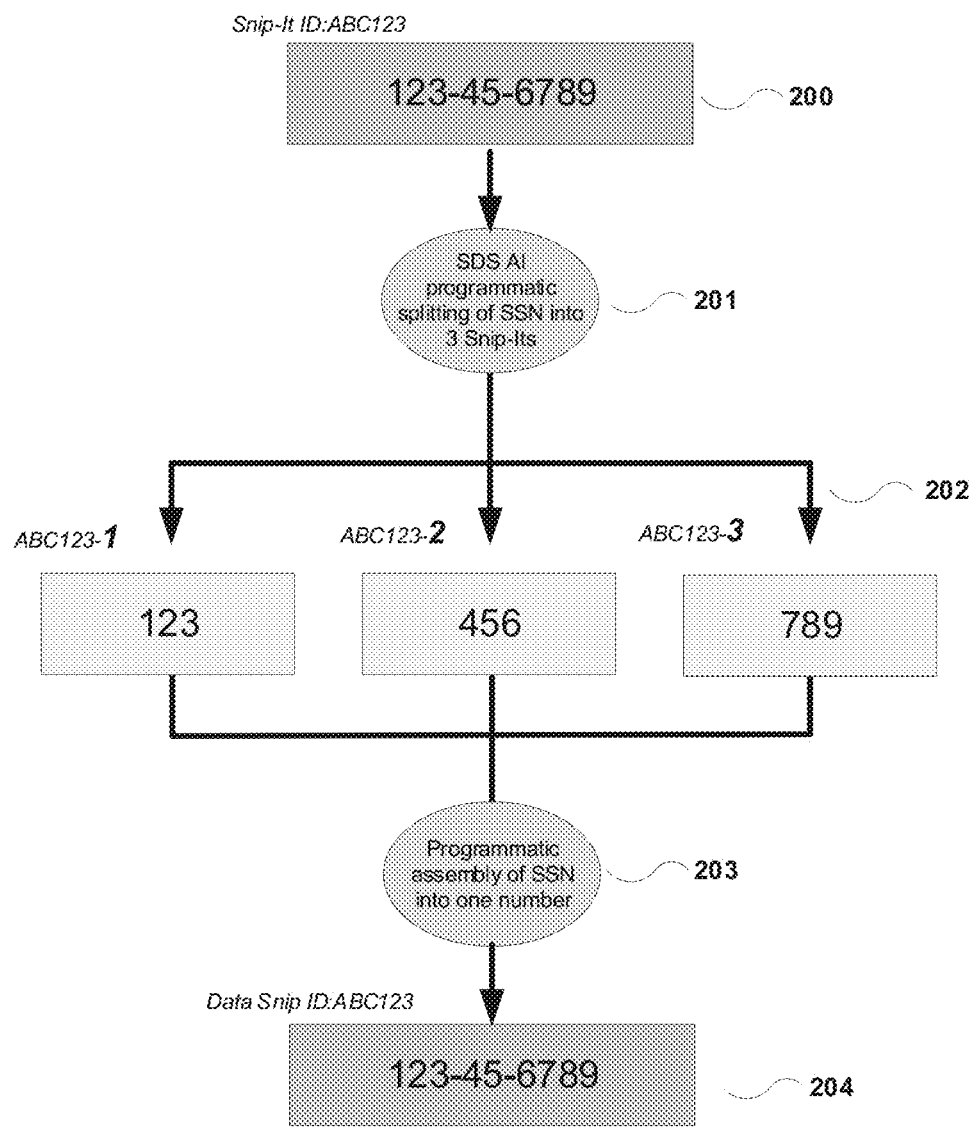
FIG. 2A illustrates an embodiment of Data Shred Processing, where Snip-It break locations are fixed.

FIG. 2A demonstrates an overview of the shredding and subsequent reassembly of a Social Security Number (SSN). This shredding and reassembly process can be applied to any data obtained from the SQL database as described above. An SQL database field 200 is predetermined to be stored in the SDS database. FIG. 9 discussed below explains the SQL table. In some embodiments, the first step to being shredding the data, is to obtain the length of the number of characters for each piece of data that will undergo the shredding process. One example is that the character length for the social security number as shown in FIG. 2A is obtained, which in this example is nine.

Figure 2B:
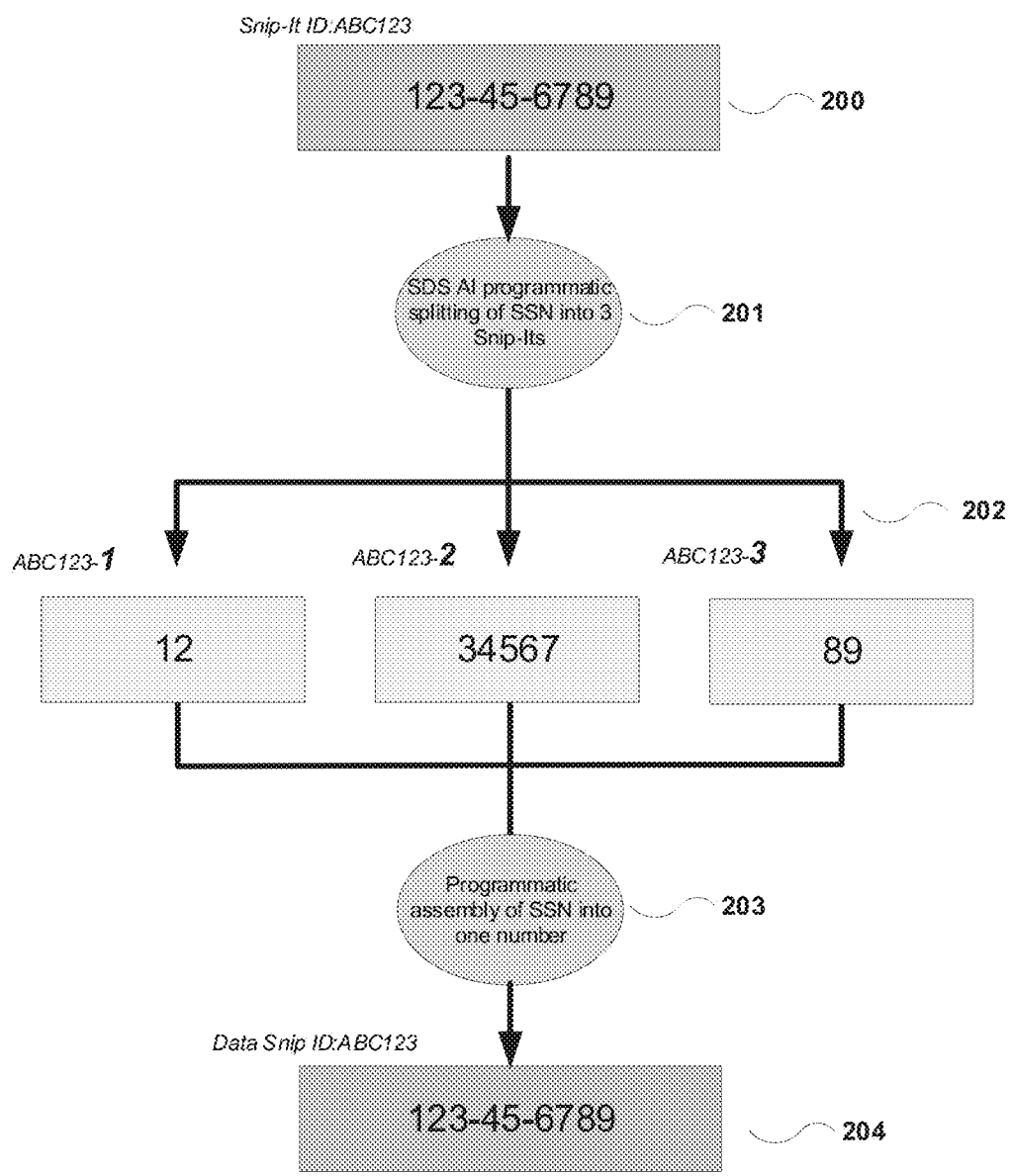
FIG. 2B illustrates an embodiment of Data Shred Processing, where Snip-It break locations are randomized.

At 201, the SDS AI programmatic process shreds the field into a predetermined number of Snip-Its shown at 202. In some embodiments the number of Snip-its can be chosen by inputting a configuration factor. For example, in an embodiment that has a configuration factor of three, SDS AI shreds the piece of data, such as a social security number into three Snip-its, based on the obtained character length as described above. In the embodiment of FIG. 2A, at 202, the Snip-It process is shown to break the plain text into fixed lengths. In some embodiments, the number of Snip-Its is determined by the sensitivity or confidentiality level chosen by a user. The predetermined field can be divided into a greater or lesser number of Snip-Its depending on the sensitivity of the information. More sensitive information can be divided into a greater number of Snip-Its than less sensitive information. FIG. 2A displays a fixed character Snip-It and FIG. 2B shows the random selection of breaks of shredding. In execution, the SDS AI programmatic process shreds the SQL field based on predetermined configurations. The most secure method is random because it eliminates patterns. As an example, in some embodiments that use the random selection option, and have a configuration factor of three, SDS AI shreds the piece of data into three pieces, with each of the three pieces having a random length, or number of characters based on the obtained character length. Users can also select fixed length shredding therefore reducing the number of rows in the Archive Table. Example: A company has an account scheme where the first five characters are the same, prefixed. That Snip-It would only appear once in the Archive Table.

The Snip-Its at 202 are stored in the SDS database. Each Snip-It is stored as a separate record in SDS. In some embodiments, the Snip-Its are stored as plaintext, without the corresponding contextual fields in the archive table. For example, the social security number shown in FIGS. 2A and 2B, was shredded into three Snip-Its. Each Snip-It can be stored as a separate record in the SDS archive table, without the context that the stored numbers represent portions of a social security number.

At 203, the SDS AI programmatic process reassembles the Snip-Its back into order, and into one field, as determined by their stored context or location, so that the original plaintext data is restored, as shown in 204. The plaintext data value shown in 204 is then returned to the SQL database.

FIG. 2B demonstrates an overview of the shredding and subsequent reassembly of a Social Security Number (SSN), in which the Snip-It process at 202 breaks the plaintext at randomized locations. Again, this shredding and reassembly process can be applied to any data obtained from the SQL database as described above. Processes 200, 201, 203, and 204 of FIG. 2B are otherwise identical to processes 200, 201, 203 and 204 of FIG. 2A described above.

Figure 3:
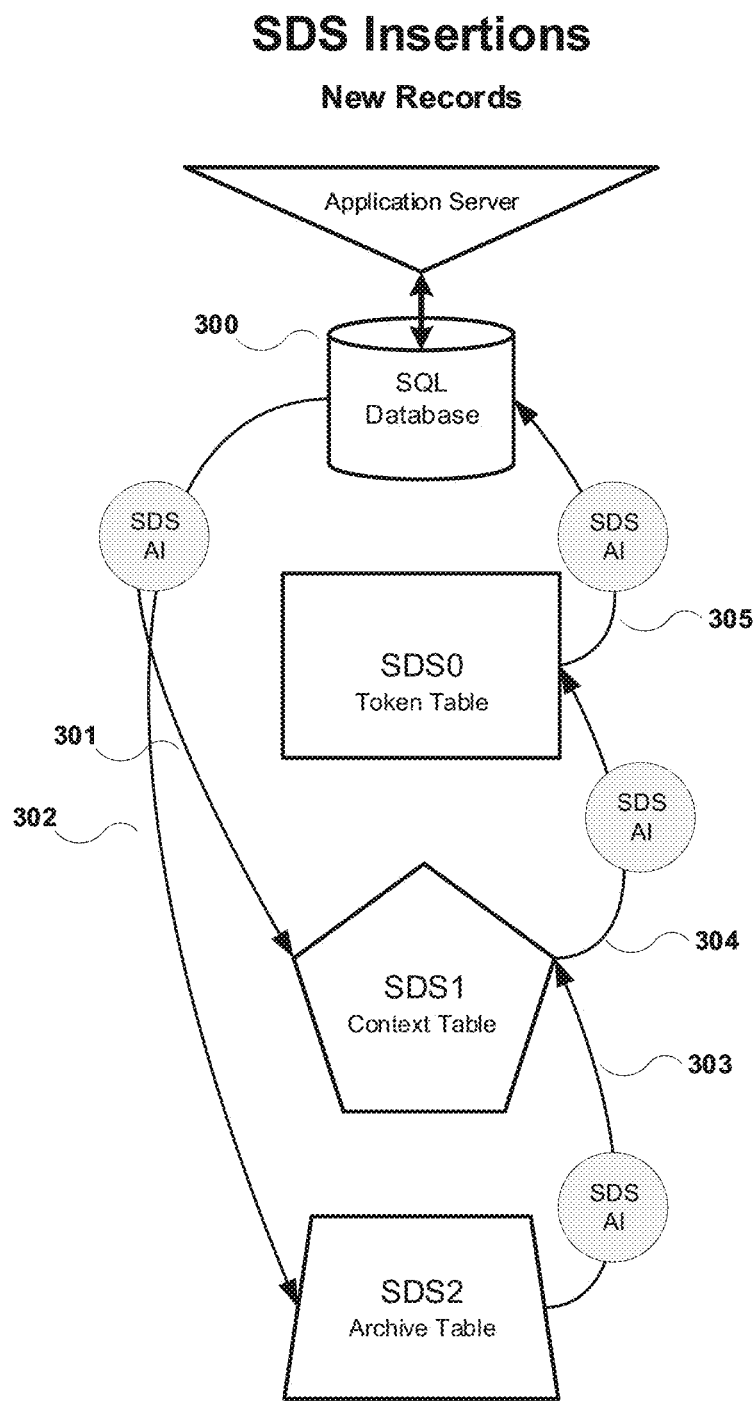
FIG. 3 is a flow diagram illustrating the insertion of new records into an SQL database of the present disclosure.

FIG. 3 illustrates the steps of how a new record is inserted into the SQL database, and how the new record is processed by the SDS AI.

A new record is inserted into the SQL database at 300 through the application server. At 301, SDS AI triggered by operations in 300, reads record information from the SQL table, and stores the new record temporarily in machine memory (RAM). This information contains location details of the SQL field locations.

At 302, SDS AI triggered by operations in 300, reads fields from the SQL record and shreds them into predetermined lengths (See FIG. 2A) that are called Snip-Its. Each Snip-It is then compared to previously stored plain text (SDS2 Values) located in the Archive Table (see FIGS. 11A and 11B) for a match. Each SDS2 value has a corresponding SDS2-H ID (Hashed Value). If the SDS2 Value already exists, then the SDS AI returns the existing SDS2-H ID. If the SDS2 Value is unique, the value will be inserted into the Archive Table, and a new hash value will be generated and stored in SDS2-H The hash value (SDS2-H ID) is generated using the plaintext value (SDS2). SDS AI then returns the new or already existing SDS2-H ID.

At 303, SDS AI returns the SDS-H IDs to the record maintained in temporary RAM and properly distributed by location values. If more than one Snip-It, shown in FIG. 2A or 2B, is used to represent the SQL plain text value the hashes are combined and separated by a delimiter as part of the SDS1 Key Value shown in FIGS. 12A and 12B. SDS AI generates a new SDS1 Key Value based on new field data and a new date and time stamp (MMDDYYYYhhmmssms). Date Time Stamp is a change field with the purpose of generating a unique encrypted text and one-way hash values. This is achieved by randomizing the positions of the Time Stamp values eliminating patterns. (e.g. msMMhhYYDD-YYssmm). Lastly, the SDS1 Key Value string that is in temporary RAM, is encrypted and stored as the SDS1 Key Value in the Context Table. It is important to note there is no direct relationship between the plain text Snip-Its of the Archive Table and the encrypted SDSI Key Value string. SDS AI then generates a hash value and stores it in SDS1-H ID field of the Context Table related to the SDS1 Key Value as shown in FIGS. 12A and 12B. The Hash value (SDS1-H) is generated by hashing the encrypted key value, SDS1 Key Value, which was stored in the Context Table.

At 304, SDS AI encrypts the SDS1-H ID (hash) and inserts the SDS0 Key Value into the SDS0 Token Table. The SDS0 Key Value, which is stored in the Token Table, is generated by encrypting the SDS1-H ID Hash Value from the Context Table. SDS AI also creates a hash from the temporary RAM data related to the SQL plain text index value used to search the SQL Database as shown in FIGS. 12A and 13A. For example, if the index value used to search the SQL Database is the account number found in Row 2 (R2) of the SQL Table of FIG. 9, the hash value (SDS0-H ID) stored in the Token Table is generated by hashing the SDS1 Key Value stored in RAM prior to the SDS1 Key Value being encrypted and stored in the Context Table. In particular, SDS0-H ID would be the hash value of the "P1R2I1_H-301_H-302" portion of the SDS1 Key Value, as this would be the representation of the account number found in I1 and R2 of the SQL table of FIG. 9. The portion of the SDS1 Key Value relating to the account number is hashed in embodiments that use the account number as a searching tool or identifier for searching the SDS database and/or SQL database. In other embodiments where other criteria or portions of other criteria, such as a company name, client name, first names, last names, date of birth, social security numbers, or other dates, are used as a searching tool, these corresponding portions of the SDS1 Key Value, are hashed to produce the SDS0-H ID. SDS0-H is then stored in the SDS0 Token Table. Future retrievals can be conducted using either the Token (SDS0 Key Value) or the hash value (SDS0-H ID), which are both stored in the Token Table shown in FIGS. 13A and 13B.

At 305, SDS AI inserts the SDS0 Key Value into the predetermined SQL field for the selected record (SDS Placeholder). In some embodiments, if an available SQL field is large enough, the SDS0 Key Value is inserted into the available field. In other embodiments, a new field can be added to support the size of the SDS0 Key Value. In yet other embodiments, the smaller SDS0-H hash can be stored in the available SQL field. These configurations can be selected as options depending on the database and the ability to alter the SQL Tables. Temporary RAM is then cleared.

Figure 4:
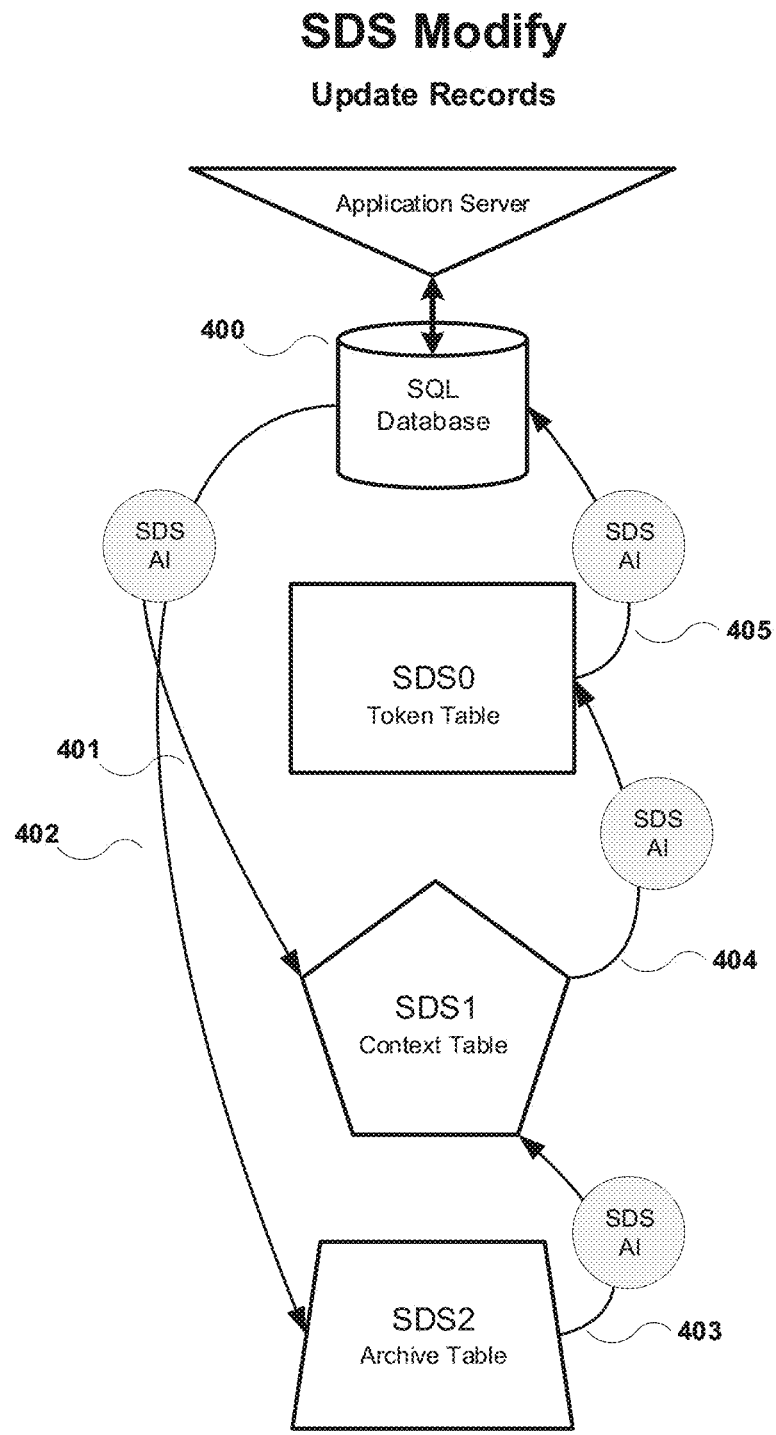
FIG. 4 is a flow diagram illustrating the modification of an existing record in the SQL database of the present disclosure.

FIG. 4 illustrates how an existing record is updated or modified in the SQL database, and how the updated or modified record is processed by the SDS AI. A new record is inserted into the SQL database at 400 through the application server. At 401, SDS AI triggered by operations in 400, reads record information from the SQL table and stores the new record temporarily in machine memory (RAM). This information includes location details of the SQL field locations.

At 402, SDS AI triggered by operations in 400, reads fields from the SQL record and shreds them into predetermined lengths or Snip-its, again shown in FIGS. 2A and 2B. Each Snip-It is then compared to previously stored plain text (SDS2 Value) located in the Archive Table shown in FIGS. 11A and 11B for a match. Each SDS2 value has a corresponding SDS2-H ID or Hashed Value. If the SDS2 Value already exists, then the SDS AI returns the existing SDS2-H ID. If the SDS2 Value is unique, the value will be inserted into the Archive Tables, and a new hash value will be generated and stored in SDS2-H. The hash value (SDS2-H ID) is generated using the plaintext value (SDS2). Also, SDS AI then returns the new or already existing SDS2-H ID.

At 403, SDS AI returns the SDS-H IDs to the record maintained in temporary RAM and properly distributed by location values. If more than one Snip-It is used to represent the SQL plain text value the hashes are combined and separated by a delimiter or fixed length shown as SDS1 Key Value in FIGS. 12A and 12B. SDS AI generates a new SDS1 Key Value based on new field data and a new date and time stamp (MMDDYYYYhhmmssms). Again, is Date Time Stamp a change field with the purpose of generating a unique encrypted text and one-way hash values. This is achieved by randomizing the positions of the Time Stamp values eliminating patterns. (e.g. msMMhhYYDDYYssmm). Lastly, the temporary RAM record is encrypted and stored in the SDS1 Key Value. SDS AI then generates a hash value and stores it in SDS1-H ID field of the Context Table related to the SDS1 Key Value shown in FIGS. 12A and 12B. The Hash value, SDS1-H, is generated by hashing the encrypted key value, SDS1 Key Value, which was stored in the Context Table.

At 404, SDS AI encrypts the SDS1-H ID or hash, and inserts the SDS0 Key Value into the SDS0 Token Table. The SDS0 Key Value, which is stored in the Token Table, is generated by encrypting the SDS1-H ID Hash Value from the Context Table. In some embodiments, the SDS0-H does not change and this is called the Standard Mode. In other embodiments, the SDS0-H may be updated with a new Hashing Algorithm (e.g., SHA-265, MDE-5, Twofish, and the like). These other embodiments are called the Enhanced Mode. If the SDS0-H is changed or updated, the SDS AI creates a hash from the temporary RAM data related to the SQL plain text index value used to search the SQL Database.

For example, if the index value used to search the SQL Database is the account number found in Row 2 (R2) of the SQL Table of FIG. 9, the Hash Value or SDS0-H ID stored in the Token Table is generated by hashing the SDS1 Key Value stored in RAM prior to the SDS1 Key Value being encrypted and stored in the context table. In particular, SDS0-H ID would be the hash value of the "P1R2|1_H-301_H-302" portion of the SDS1 Key Value, as this would be the representation of the account number found in I1 and R2 of the SQL table of FIG. 9. The portion of the SDS1 Key Value relating to the account number is hashed in embodiments that use the account number as a searching tool or identifier for searching the SDS database and/or SQL database. In other embodiments where other criteria or portions of other criteria, such as a company name, client name, first names, last names, date of birth, social security numbers, or other dates, are used as a searching tool, these corresponding portions of the SDS1 Key Value, are hashed to produce the SDS0-H ID. SDS0-H is stored in the SDS0 Token Table. Future retrievals can be conducted using either the Token, SDS0 Key Value, or the hash value, SDS0-H ID, which are both stored in the Token Table shown in FIGS. 13A and 13B.

At 405, SDS AI inserts the SDS0 Key Value (Token) into the predetermined SQL field for the selected record (SDS Placeholder). In some embodiments, if an available SQL field is large enough, the SDS0 Key Value is inserted into the available field. In other embodiments, a new field can be added to support the size of the SDS0 Key Value. In yet other embodiments, the smaller SDS0-H hash can be stored in the available SQL field. These configurations can be selected as options depending on the database and the ability to alter the SQL Tables. Temporary RAM is then cleared.

Figure 5:
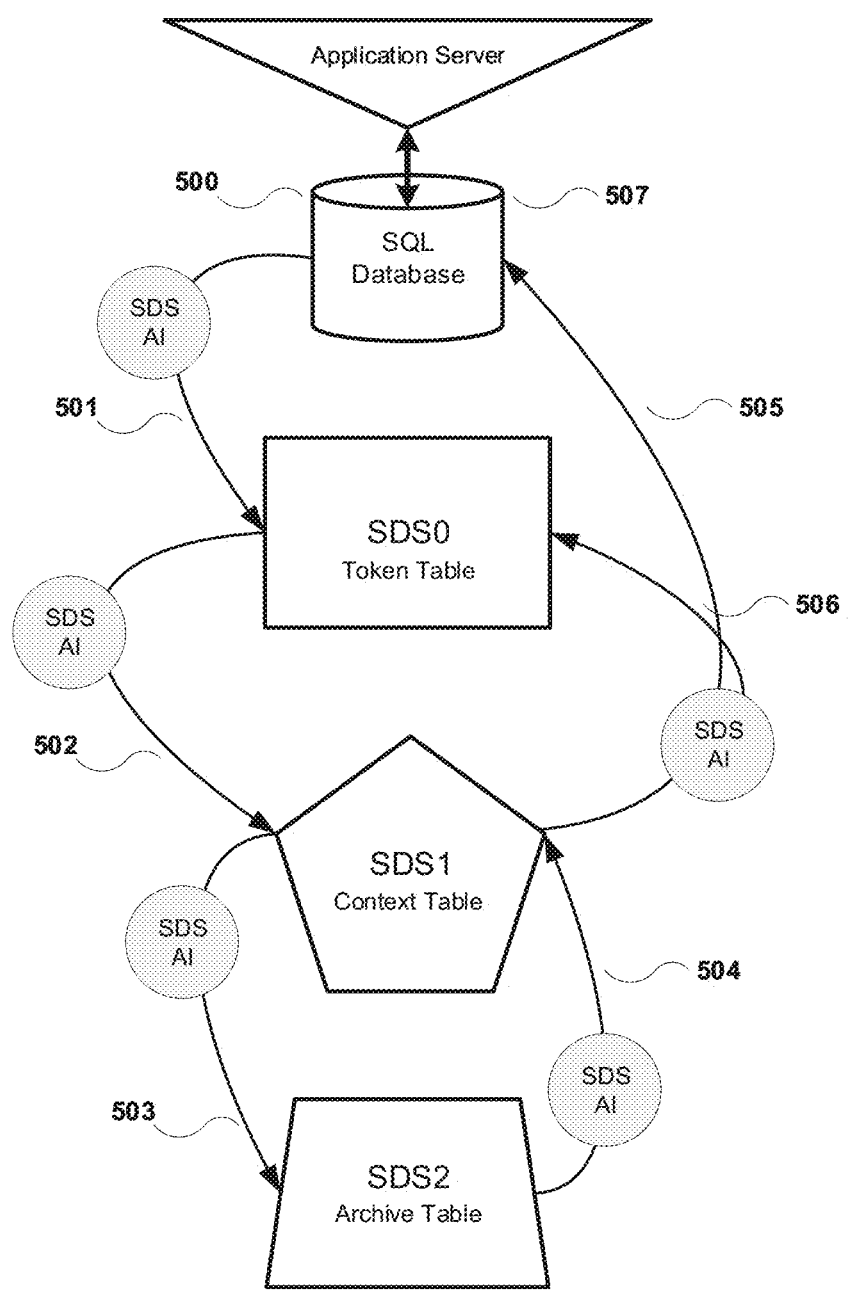
FIG. 5 is a flow diagram illustrating the retrieval of an existing record in the SQL database of the present disclosure, using a hash previously generated by SDS.

FIG. 5 illustrates how a record is retrieved using the SDS0-H ID hash value stored in the token table shown in FIGS. 13A and 13B. At 500, Application Services requests a record be retrieved for viewing on some authorized device (e.g. PC, Tablet, Phone, and the like). The SQL Database executes the selected process of retrieving an existing record in the SQL Database.

At 501, SDS AI, triggered by operations in 500, reads the index field and preforms the one-way hashing operation. The resulting hash is then presented to the SDS0-H column for a match. For example, in a customer to vendor scenario, the customer can transmit to the vendor through various means information such as an account number (such as, the account number from FIG. 9 used to search the SQL Database, as in previous examples). These various means are used to authenticate themselves in order to receive certain information stored in the SDS system. A hash value generated from the customer provided information, such as the account number, would be compared to the SDS0-H ID hash value previously stored in the token table. If there is a match, SDS AI proceeds to step 502.

At 502, SDS AI locates the SDS0 Key Value based on the corresponding SDS0-H ID hash value, and decrypts the SDS0 key value resulting in the SDS1-H value, stored in the Context Table.

At 503, SDS AI locates the SDS1 Key Value corresponding to the SDS1-H value, and decrypts the context record (string) of the Key Value into temporary RAM for processing.

At 504, SDS AI locates the SDS2-H Values stored in the Archive Table based on the decrypted SDS1 Key Value, and returns the plain text Snip-It (SDS2 Value) and appropriately assembles the context, SQL record and field position.

At 505, SDS AI delivers the plain text data in temporary RAM to the appropriate SQL Database record.

At 506, SDS AI generates a new SDS1 Key Value based on at a minimum new date and time stamp //// (MMD-DYYYYhmmssms). Then, the new SDS1 Key Value is hashed and that value is saved in SDS1-H. This new SDS1-H value is then encrypted and copied to SDS0 Key Value. The SDS0-H does not change (Standard Mode). If in the Enhanced Mode, the SDS0-H will be updated with a new Hashing Algorithm (e.g., SHA-265, MDE-5, Twofish, and the like). Date Time Stamp is a change field with the purpose of generating a unique encrypted text and one-way hash values. This is achieved by randomizing the positions of the Time Stamp values eliminating patterns. (e.g. MMhhYYD-DYYssmm).

At 507, the SQL Database serves the requested data to the device for viewing. Temporary RAM is cleared.

Figure 6:
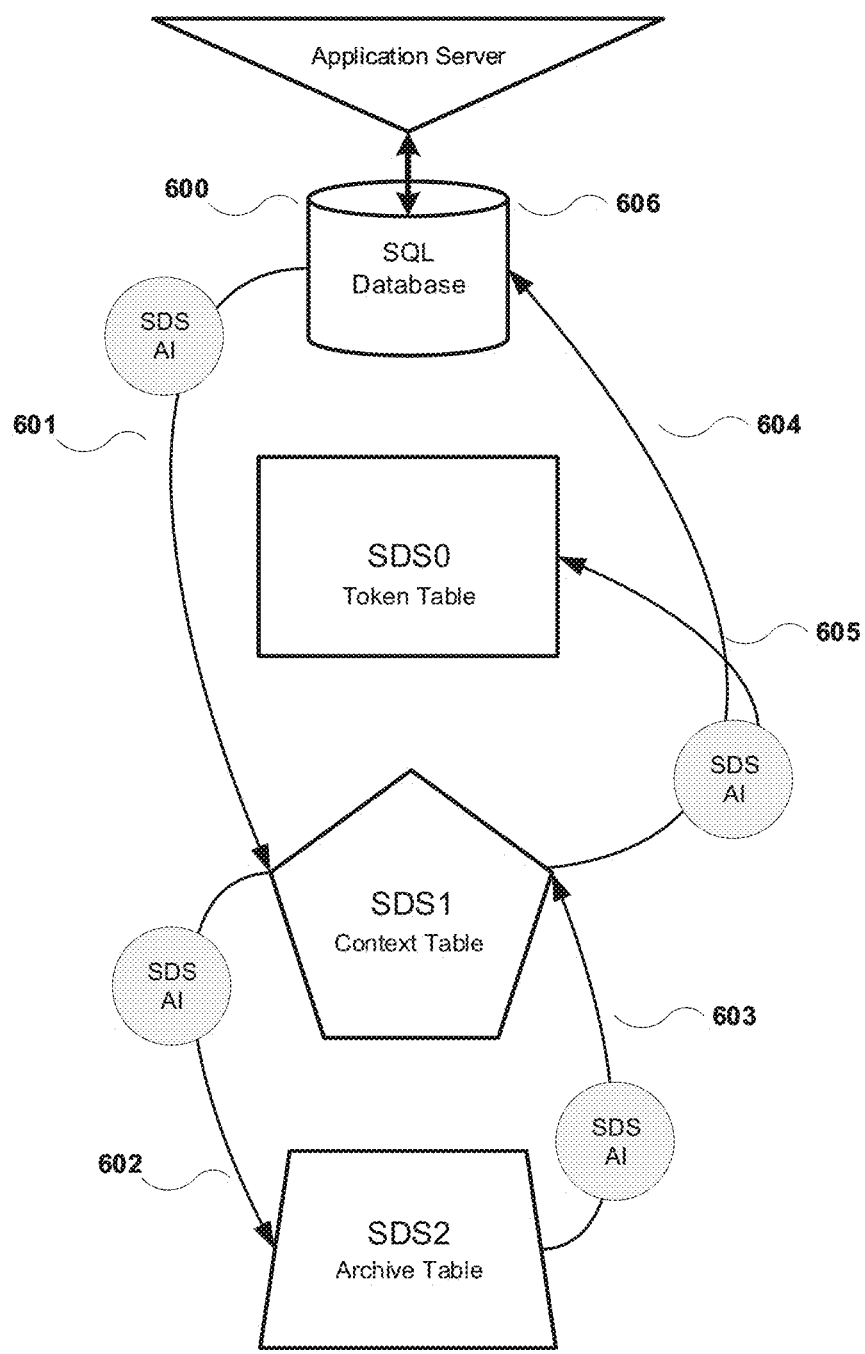
FIG. 6 is a flow diagram illustrating the retrieval of an existing record in the SQL database of the present disclosure, using a token previously generated by SDS.

FIG. 6 illustrates how a record is retrieved using a Token, otherwise known as the SDS0-Key value stored in the Token Table shown in FIGS. 13A and 13B.

At 600, Application Services, in some embodiments, requests a record be retrieved for batch processing (e.g. Billing, Reporting, and the like). SQL Database executes the select process for existing records in the SQL Database so for each record the process executes. For example, if a user wants to lookup a record where many fields exist in SDS, the user provides information such as an Account Number (ABCD1235). The Account Number is entered into the Graphical User Interface (GUI), which provides the information to SDS AI. When the SQL SELECT query arrives to the database (SDS preconfigure index field lookup), SDS AI takes the plaintext Account number entry and generates, in some embodiments, a SHA256 hash and then searches the Token Table's SDS0-H column for a match. If there is a match between the hash of information, such as the account number and the SDS0-H column of the Token Table, SDS AI proceeds to 601.

At 601, SDS AI triggered by operations in 600 reads the associated SDS Token, and decrypts the Token resulting in the SDS1-H value for matching. The design maintains the SDS0-H value separate from the SDS1 Key Value, such as in separate tables. If the SDS0-H hashing generation is cracked, the only information an attacker has is the encrypted SDS0 Key Values. Now, the attacker must crack the encryption of SDS0 Key Value to find the Context Table hash in SDS1-H. Step 601 to 606 all happens in ~2 or less milliseconds.

From the initial request to process plain text data into the SDS system to the creation of a Token, about 1 to 2 milliseconds will have passed per row of data from the SQL table. In addition, about 1 to 2 milliseconds will be needed per row of data to retrieve shredded data, from a Token back to the plain text. These processing times can be reduced based on available processing power.

The resulting hash is then presented to the SDS0-H column for a match.

At 602, SDS AI locates the SDS1 Key Value in the context table, and decrypts the context record (string) into temporary RAM for processing.

At 603, SDS AI takes the SDS2-H Values in the Archive Table and returns the plain text Snip-It and appropriately assembles the context, SQL record and field position.

At 604, SDS AI delivers the plain text data in temporary RAM to the appropriate SQL Database record.

At 605, SDS AI generates a new SDS1 Key Value based on at a minimum a new date and time stamp (MMD-DYYYYhhmmssms). Then, the new SDS1 Key Value is hashed and that value is saved in SDS1-H. This new SDS1-H value is then encrypted and copied to SDS0 Key Value. The SDS0-H does not change (Standard Mode). If in the Enhanced Mode, the SDS0-H may be updated with a new Hashing Algorithm (e.g., SHA-265, MDE-5, Twofish, and the like). Date Time Stamp is a change field with the purpose of generating a unique encrypted text and one-way hash values. This is achieved by randomizing the positions of the Time Stamp values eliminating patterns. (e.g. msMMhhYYDDYYssmm).

At 606, SQL Database serves the requested data to the device for viewing. Temporary RAM cleared.

SDS by design can enable the Nonce Feature in certain embodiments so that each Token Key Value can only be used once. This operation will regenerate SDS1 Key Values, SDS1-H values and finally the SDS0 Key Value (Token). This operation also has properties that trigger the operation depending on the data event (e.g., View retrieval, Batch retrievals and Updates). Increase in performance may be critical for some operations (i.e., Month-end billing, EOY reporting, and the like) and can be isolated.

Figure 7:
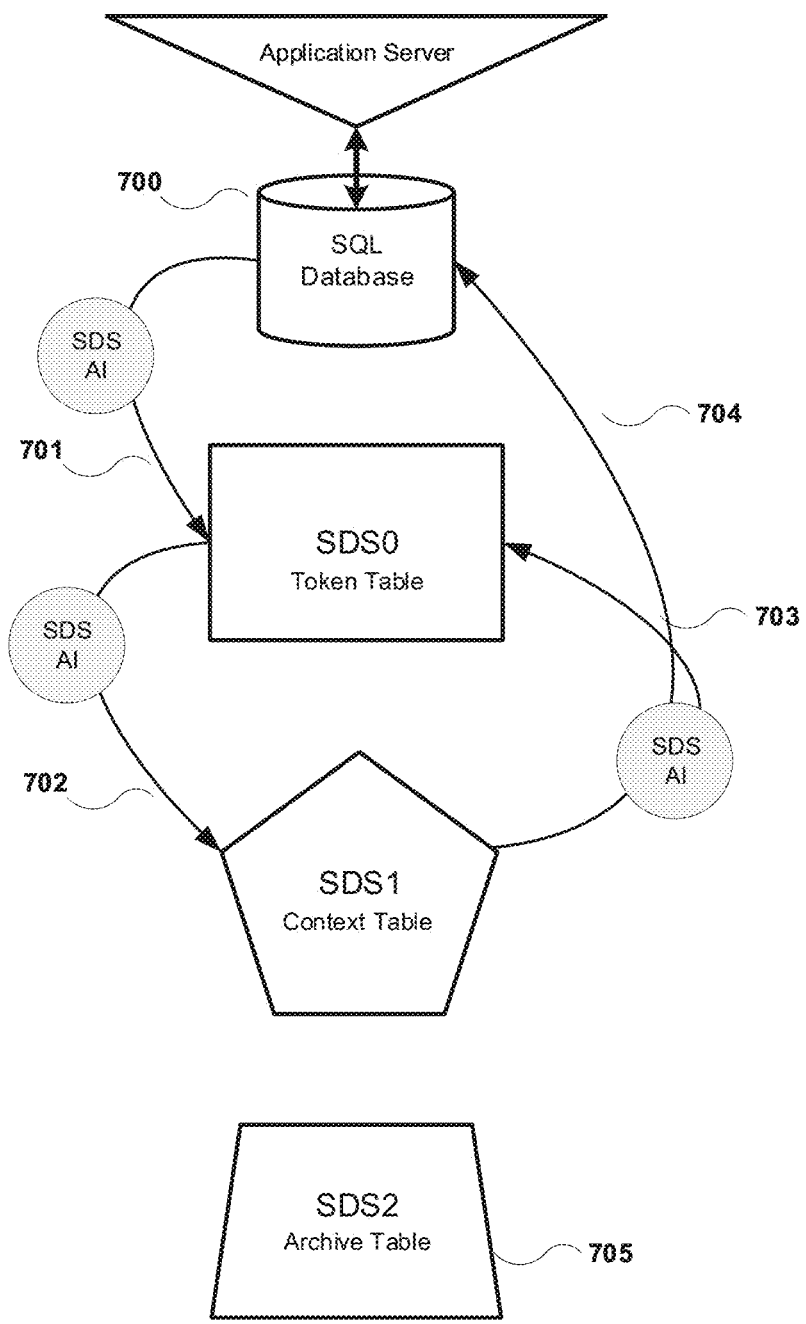
FIG. 7 is a flow diagram illustrating the deletion of an existing record in the SQL database of the present disclosure.

FIG. 7 illustrates how a record is deleted. At 700, Application Services request a record to be deleted. SDS AI retrieves the SDS Token or Hash Value with the predetermined SQL index value. SQL Database executes the Delete process for existing records in the SQL Database so for each record the process executes.

At 701, SDS AI triggered by operations in 700 reads the associated SDS Token (SDS0 Key Value) and proceeds to step 702 or in other embodiments, generates the index hash (based on an input or information such as an account number from a client) for a match with the stored SDS0-H ID Hash Value. If the hash values match, SDS AI proceeds to step 702.

At 702, SDS0 Key Value is decrypted resulting in the SDS1-H value for matching. Selected SDS records are then deleted in the context table.

At 703, SDS AI returns to the previous (701) record, and deletes the SDS0 record.

At 704, SDS AI returns to the SQL Database the associated SDS records have been deleted.

At 705, it is important to note the SDS2 Archive Table is not modified in deletions. The plain text Snip-Its in the Archive Table are stored out of context, and each plain text Snip-It can relate to multiple unrelated records. For example, the name "Johnson" for a certain account can be stored as two separate plain text Snip-Its, "John" and "son". These plain text Snip-Its, which are stored in the Archive Table, can relate to multiple accounts for various "Johns". The "son" Snip-It could also be related a separate account that has the plain text "Sonoma" for a county location stored as "Son" and "oma". Therefore, while the Token and Context Table information is deleted, the Archive Table information is not, so as to preserve information relating to multiple other records, and their SDS1 Key Value strings, that are not associated with the record being deleted.

This scheme also increases the efficiency of storage, as the same data is not likely to be stored twice.

SDS by design allows for the integration of many cryptographic solutions. Many organizations because of their nature will want to control the Cryptology and/or Key Management. SDS leverages the uniqueness of shredding data and the consequence it has on data patterns and usage. These two operations are now seen as random operations. Therefore, these two operations provide no clues to attackers. In SDS's most advanced cryptology configuration and usage, multiple algorithms and nonce keys can be used presenting a challenge which attackers have never encountered.

Figure 8:
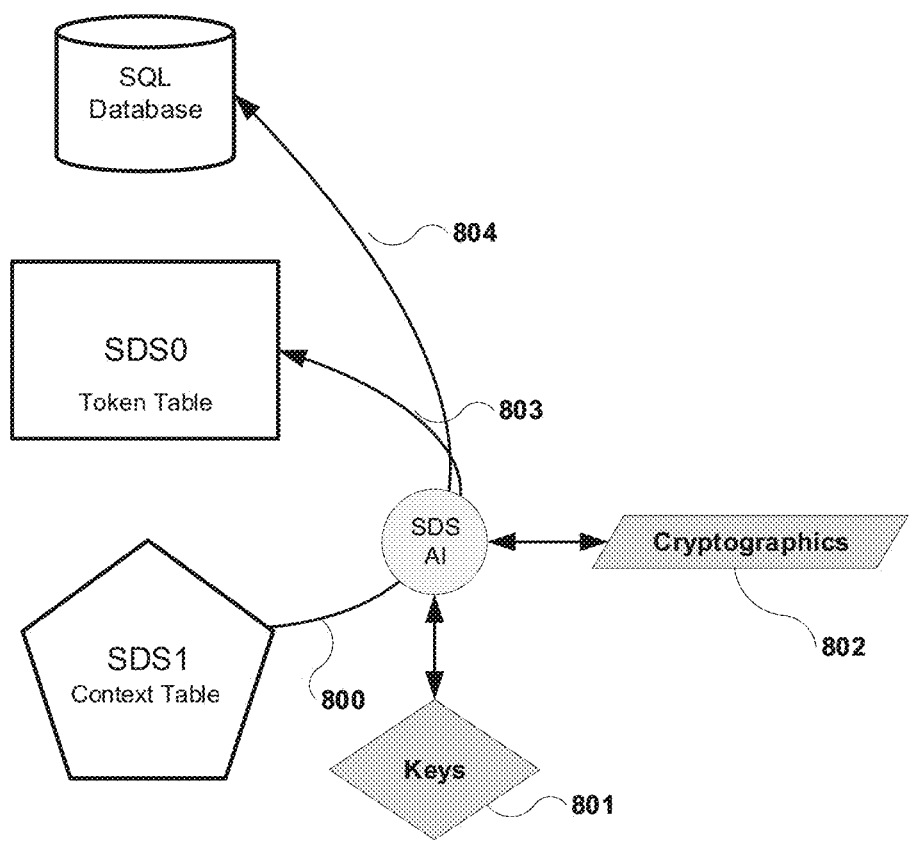
FIG. 8 is a flow diagram illustrating various aspects of encryption and hashing of the present disclosure.

FIG. 8 is an overview of how SDS AI interacts with Keys and Cryptographics in order to encrypt or hash confidential information.

At 800, SDS AI takes the SDS2-H Values and returns the plain text Snip-Its and appropriately assembles the context, SQL record and field position.

At 801, SDS AI requests a key from the Key Management Store, and calls the Cryptographic operation in 802.

At 802, SDS AI conducts the encryption and decryption process. SDS AI is designed to integrate with existing Crypto Programs so that different solutions can be selected by the operator. These operations supports both encryption and hashing functions as configured.

At 803, SDS AI processes information maintained in RAM, when encrypted or hashed is then stored in SDS0; SDS0-H and SDS0 Key Value.

At 804, SDS AI then encrypts the SDS0-H value and stores it in the SQL Database. If configured, the SDS AI will produce a Hash on the SQL Database table index field and store it in SDS0-H.

The SDS Scheme is designed as an SSE implementation so that some data is left searchable, and the relating confidential data is shredded. In FIG. 9, a typical SQL table stores public information (i.e., Last Name, First Name) and confidential information (i.e., Date of Birth, Social Security Number) regarding certain people. With the end goal of protecting confidential information, the user has the option of choosing how much data the user wants to secure.

Referring to FIG. 10, the user has chosen to protect the Last name, DOB and SSN fields of FIG. 9. When SDS preforms its operations, the selected plaintext is updated with one of three values: NULL values, SDS Tracers or misinformation. The purpose of Tracers are feedback points identifying the data's location. SDS misinformation can insert random names, dates and numbers to minimize or eliminate any coding changes required by applications error handling. FIG. 10 represents the end processing with Tracers enabled.

The SDS operations result in entries into the SDS tables as depicted in FIGS. 11A, 11B, 12A, 12B, 13A and 13B. The operations include 3 one-way hashing algorithms and 2 encryption algorithms. The three SDS tables (Archive, Context and Token) in FIGS. 11A and 11B, 12A and 12B, 13A and 13B, respectively, display the results of the aforementioned operations for shredding (SDS) the SQL table of FIG. 9. In particular, FIGS. 11A, 12A and 13A represent the SDS rules of construction, while FIGS. 11B, 12B, and 13B, display the results of the SDS rules of construction, showing the same tables as they would appear in certain production embodiments.

FIG. 11A shows the Archive Table populated with plaintext (SDS2 Value) obtained from the Snip-It Process described in FIGS. 2A and 2B. The process starts with production data being shredded from the SQL table of FIG. 9. Shredded values are matched with the SDS2 Value column. If a match is found, then the paired hash in SDS2-H is used. If there is not a match, then the value (plain text Snip-It) is inserted into the Archive table, and a new corresponding SDS2-H hash value is generated. To generate the corresponding SDS2-H ID hash values, a Salt (SDS2 Salt) is used. The SDS2 salt value used at the time of hashing is controlled by a pepper offset value. The SDS2-H ID hash is generated for each plain text value. The hash value is generated by using the salt and pepper values, and hashing the plain text value. In some embodiments multiple salts may be used.

In cryptography, a salt is random data that is used as an additional input to a one-way function that "hashes" a Snip-It. As the salt is part of the hash, you store the salt on the database. SDS uses salt plus the Snip-It (Snip-It+Salt) to generate the hash. The primary function of a salt is to defend against dictionary attacks or against its hashed equivalent, a pre-computed rainbow table attack.

Pepper works the same way salt, but is not stored in the database. Pepper is at least as long as the salt and is stored separately from the value to be hashed, often as an application secret. The pepper is small and randomly generated for each input to be hashed, and is never stored. In some embodiments, the pepper can be part of the code, and multiple peppers can be used, only some of which affect the function of the SDS. For example, multiple ghost peppers (peppers that do not affect the SDS) can be stored in the code, to obfuscate the identity of the pepper or peppers that affect the functioning of the SDS. SDS would use a pepper stored in the SDS AI code for security and performance. The pepper can be used as an offset value to the stored salt values. A pepper adds security to a database of hashes because it increases the number of Snip-Its possibilities.

FIG. 11B shows the Archive Table of FIG. 11A, as the Archive Table would appear in certain production embodiments. Here, the SDS2-Hash ID of FIG. 11B, appears as it would, after using SHA256 one-way hashing algorithm.

FIG. 12A shows a Context Table with a SDS1 Key Value, and corresponding SDS1-H ID hash value. The context string or SDS1 Key Value is constructed using location information from the SQL Table of FIG. 9, and fields from the Archive Table of FIG. 11A. The Parent location starts with the "Pn" value that indicates the source database and table. The "Rn" value is the row id in the SQL table for primarily used for integrity purposes. Depending on the SDS usage model, the Rn Value can be used to repopulate the source row. In certain embodiments, the SDS could shred the entire row of data and place the corresponding Token (SDS0 Key Value) in a specific field (old or new) whereby the retrieval would restore the complete row. The "In" value represents the index column location. This index field is also hashed for Adhoc retrieval by the application. The "Vn" value represents the location column. The "Hn" value represents the hashed value related to the SDS2 Value of the Archive Table. These values continue until all the factors are related.

For example, the "P1R2|1_H-301_H-302" portion of the key value, represents SQL table P1 of FIG. 9, row 2 of that table, the 11 Account Number column corresponding to row 2, and the hash values (SDS1-H) in the Context table corresponding to the SDS1 Key value containing the SDS2-H related to the plain text Snip-It values (SDS2 Value), which as a whole constitute the account number. The key value can continue on in such a manner to include additional information from row 2, including the last name, first name, DOB, and SSN. The key value will include a delimiter and timestamp.

It is important to note that the SDS1 Key Value shown in FIG. 12A, is not the same Key Value stored in the context table. The key value shown in FIG. 12A, is an example (for illustrative purposes) of a key value stored in RAM, prior to encryption and storage in the context table. Any key value actually stored in the context table would be encrypted.

After the key value is generated, and encrypted it is stored in the context table. A corresponding hash value, SDS1-H ID, is generated by hashing the SDS1 Key Value. The hash is stored in the context table corresponding to the Key Value.

FIG. 12B shows the Context Table with the encrypted key value, or SDS1 Key Value, and corresponding hash value, SDS1-H ID, as it would appear in certain production embodiments, after selected encryption and hashing techniques are selected. The hashing technique used to generate SDS1-H ID can be the same or different technique used to generate the SDS2-H ID hash value of the Archive Table.

FIG. 13A shows the Token Table with the SDS0 Key Value, and the corresponding SDS0-H ID hash value. The SDS0 Key Value is generated by encrypting the SDS1-H ID hash value stored in the in the context table. In certain embodiments, a corresponding hash value, (SDS0-H ID) is also generated and stored in the Token Table. The SDS0-H ID hash value is generated by hashing a portion of the SDS1 Key Value stored in RAM, prior to the SDS1 Key Value being encrypted and stored in the Context Table. For example in some embodiments, the "P1R2|1_H-301_H-302" portion of the SDS1 Key Value is hashed to generate the SDS0-H ID hash value stored in the Token Table. The portion of the SDS1 Key Value relating to the account number is hashed in embodiments that use the account number as a searching tool or identifier for searching the SDS database and/or SQL database. In other embodiments where other criteria or portions of other criteria, such as a company name, client name, first names, last names, date of birth, social security numbers, or other dates, are used as a searching tool, these portions of the SDS1 Key Value, are hashed to produce the SDS0-H ID.

The Token (SDS0 Key Value) or the SDS0-H Hash value can be used to retrieve data stored by SDS at a future time. In certain instances where minimal modifications to the original SQL table must be made, a hash retrieval method can be preferable. Depending on the selected Hashing technique, the hash value can be easily compatible in terms of size or length to the original SQL table. In other instances, where batch processing must be completed, the Token retrieval method may be preferable. Depending on the type of encryption method used to generate the Token (SDS0 Key Value), the SQL table may have to be modified to include another column to store the Token.

Figure 14:
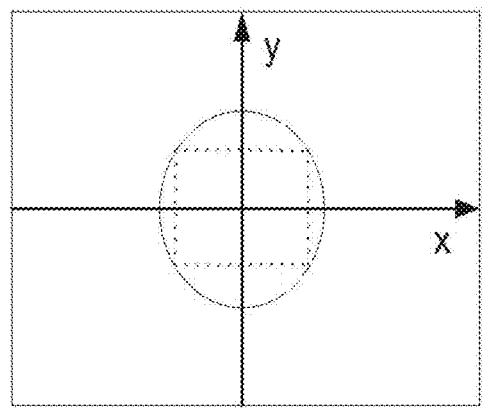
FIG. 14 illustrates an example of a many to many relationship.

The SDS model is unique because it provides what mathematics calls a "relationship that is not a function". Cybercrime's foundation is in mathematics. Cybercriminals, through many tools, discover relationships and patterns with one goal, namely to break the encryption. To achieve this cybercriminals, need to create mathematical functions so they can iterate through the data and find the key or reverse engineer the key. Two relationships exist that produce the mathematical function: One to One and One to Many. One relationship that does not produce a mathematical function is the Many to Many relationship, as shown in FIG. 14. For example, the function of the variable (x) equals plus or minus the square root of the variable (n) minus (x) squared, as shown in FIG. 14. Here, for every (x) value, there are two (y) values and for every (y) value there are two (x) values. Without a mathematical function, cybercrime will be more difficult, if not impossible.

Figure 15:
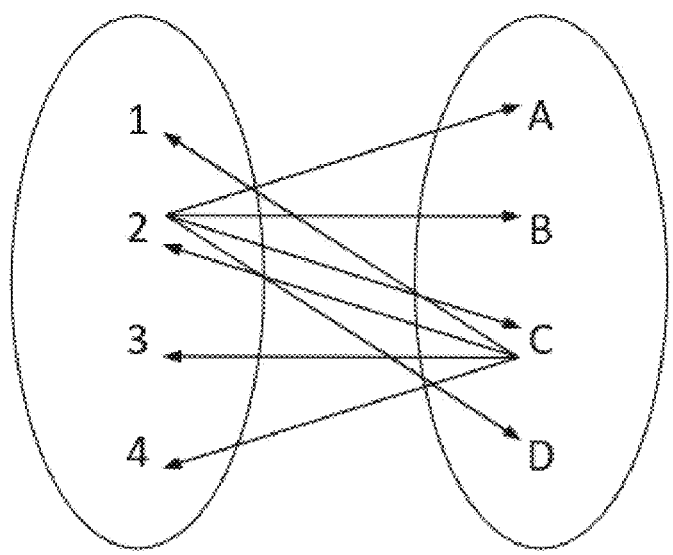
FIG. 15 illustrates an example of the many to many relationship between embodiments of the archive and context tables of the present disclosure.

The SDS model by design randomizes relationships among the tables and records. Because the data is shredded into Snip-Its they must be gathered to create new complete words. Example: The name Johnson could be stored as two Snip-Its, John and Son. If Johnson lived in Sonoma Calif., Son could be stored as two Snip-Its, Son and Oma. If Johnson lived on 123 Omaha Street, Oma and Ha could be two Snip-Its. In this example for one record John is used once, Son is used twice, Oma is used twice, and Ha is used once. This seems random. See FIG. 15, illustrating the many to many relationships as to the Context and Archive Tables.

In database design today, architects would utilize SQL intermediate tables to define the many to many relationships. This further enables attackers to find patterns in the data. SDS does not use intermediate tables, instead encrypted nomenclature (SDS1 Key Value) maintains those relationship on a one record basis.

Randomization is further enhanced by scrambling plaintext event information (e.g., Time Stamping) removing any patterns that would aid attackers. It is also important to note that the SDS model does not have a direct plain text to cipher text relationship. In other words, hashing techniques are used prior to encryption techniques, thereby no direct plaintext to cipher-text relationship exists. Most secure schemes use encryption to scramble "Plaintext" into "Ciphertext" via a Key, secret word or phrase. Attackers rely on obtaining many rows of the plaintext and ciphertext values to reverse engineer the encryption and either cracking the Key or build their own system that can read your ciphertext. The plaintext stored in the Archive Table are the values (stored out of context) used to assemble the correct SQL Database value. SDS relationships and context are contained in two encrypted fields (e.g., SDS1 Key & SDS0 Key).

As an Example: Plaintext could be Neil, Bridges, 213-43-5678. Then, once encrypted the values could be FJNSEKI2, 3K59CKSL%4X, and JFG3F0)5M@KH4 respectively. These encrypted values can now be decrypted back to their meaningful Plaintext. SDS does not have the direct plaintext to encrypted text relationship of the current example, as hashing is used prior to encryption.

In a preferred embodiment of the present disclosure, the method in which data is split into components or Snip-Its, and with a sequence of a first hashing, a first encryption, a second hashing, a second encryption, and third hashing, that optimizes security. For example, after the initial Snip-It process, the first hashing in performed on the plain text Snip-Its as shown in the Archive Table. The first encryption is then performed, that results in the generation of the SDS1 Key Value as shown in the Context Table. The second hashing is then performed, which generates the SDS1—Hash ID, as shown in the Context Table. The second encryption is then performed, generating the SDS0—Key Value, as shown in the Token Table. Lastly the third hashing is performed, generating the SDS0—Hash ID, as shown in the Token Table. The combination of hashing the data multiple times and encrypting the data multiple times, while utilizing hashing prior to the encryption steps, eliminates leakage.

The method of securely processing data as described herein, is implemented on a computer platform. The computer platform includes a processor, connected or coupled to a memory. The processor is configured logic circuitry, and/or physical circuits that respond to and execute instructions. The memory is a tangible storage medium that is readable by the processor. The memory can comprise random access memory (RAM), a hard drive, a read only memory (ROM), or any combination thereof. The memory can have instructions for controlling the processor to perform the operations necessary to securely process the data as disclosed herein.

The computer platform can further include chipsets, controllers, wireless communication devices, peripherals, interfaces, input/output (I/O) components, displays, power supplies and the like. The computer platform can be implemented as a single device, or in a distributed manner, or on a network of computers, and can use a distributed system architecture, e.g., a master-slave architecture, a client-server architecture, and the like. The computer platform can be implemented as a mobile device, a smart phone, and a personal computer. These examples are not limiting.

Some embodiments can be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

The embodiments described herein are exemplary and should not be construed as implying any specific limitation on the present disclosure. It should be understood that various alternatives, combinations and modifications of the present disclosure could be devised. The present disclosure is intended to embrace all such alternatives, modifications and variances that fall within the scope of the appended claims.

What is claimed is:

1. A method for securely processing data, comprising the steps of:
    reading data from a database and storing the data in temporary machine memory;
    splitting the data into discrete components to remove context;
    storing the discrete components in a shredded data storage database without context;
    generating a first hash identifier for each one of the discrete components by hashing each of the discrete components;
    storing the first hash identifiers and each of the corresponding discrete components in a first table;
    generating a context key value from the first hash identifier and positional information in the database;
    storing the context key value in temporary machine memory;
    encrypting the context key value;
    generating a second hash identifier by hashing the encrypted context key value;
    storing the second hash identifier and the encrypted context key value in a second table;
    generating a second key value by encrypting the second hash identifier;
    generating a third hash identifier by hashing a portion of the context key value;
    storing the second key value and the third hash identifier in a third table;
    clearing the temporary machine memory after storing the second key value and the third hash identifier; and
    using the second key value and the third hash identifier as authentication and data retrieval tools.

2. The method of claim 1 further comprising:
    receiving a request for data deletion;
    obtaining the second key value;
    obtaining the second hash identifier by decrypting the corresponding second key value;
    obtaining the context key value by decrypting the encrypted context key value corresponding to the second hash identifier;
    deleting the context key value and corresponding second hash identifier stored in the second table; and
    deleting the second key value and corresponding third hash identifier stored in the third table.

3. The method of claim 1, wherein the data is split into a predetermined number of discrete components based on a sensitivity level of the data.

4. The method of claim 1, wherein the discrete components are a fixed length based on a sensitivity level of the data.

5. The method of claim 1, further comprising: using the third hash identifier to locate the data when searching the database.

6. The method of claim 1, wherein the first hash identifier, the second hash identifier, the third hash identifier, the first key value, and the second key value are generated by use of encryption and hashing technology selected from the group consisting of: SHA-256, AES-256, MDE-5, DES, Triple DES, Twofish and any combination thereof.

7. The method of claim 1, further comprising a processing time;
    wherein the processing time is 1 millisecond to 2 milliseconds per a row of the data from an initial processing request to the generation of the second key value.

8. The method of claim 1, further comprising:
    increasing storage efficiency by using the discrete components to store data from unrelated records from different databases.

9. The method of claim 1, wherein the positional information includes a database name, database row, and database column; and
    wherein the context key value includes at least one delimiter.

10. The method of claim 1, wherein the second key value is inserted into a predetermined location in the database.

11. The method of claim 1, wherein the third hash identifier is inserted into a predetermined location in the database.

12. The method of claim 1, wherein the first hash identifier is generated with a salt value.

13. The method of claim 12, wherein the salt value is controlled by a pepper offset value.

14. The method of claim 1, further comprising a date and time stamp;
    wherein the date and time stamp include a month, day, year, hour, minute, second, and millisecond placeholder; and
    wherein the date and time stamp are used in generating the context key value.

15. The method of claim 14, wherein the position of the month, day, year, hour, minute, second, and millisecond placeholders is randomized.

16. The method of claim 15, further comprising:
    generating a new context key value after a data retrieval request or a data update request is processed.

17. The method of claim 1, wherein the discrete components are a random length based on a sensitivity level of the data.

18. A method for securely processing data comprising the steps of:
    reading data from a database and storing the data in temporary machine memory;
    splitting the data into discrete components to remove context;
    matching previously stored discrete components with the discrete components;
    returning a previously stored first hash identifier corresponding to each one of the matching discrete components, wherein the previously stored first hash identifier is stored in a first table;
    generating a context key value from the previously stored first hash identifier and positional information in the database;

storing the context key value in temporary machine memory;
encrypting the context key value;
generating a second hash identifier by hashing the encrypted context key value;
storing the second hash identifier and the encrypted context key value in a second table;
generating a second key value by encrypting the second hash identifier;
generating a third hash identifier by hashing a portion of the context key value;
storing the second key value and the third hash identifier in a third table; and
using the second key value and the third hash identifier as authentication and data retrieval tools.

19. A method for securely processing data comprising the steps of:
receiving a data retrieval request;
obtaining authentication data;
generating an authentication hash from the authentication data by hashing the authentication data;
matching the authentication hash to a third hash identifier stored in a third table;
decrypting a second key value corresponding to the third hash identifier to obtain a corresponding second hash identifier stored in a second table;
locating an encrypted context key value corresponding to the second hash identifier stored in the second table;
decrypting the encrypted context key value to obtain a context key value;
storing the context key value in temporary machine memory;
locating first hash identifiers corresponding to the context key value;
locating discrete components corresponding to each one of the first hash identifiers;
assembling the discrete components into context based on the context key value; and
returning the data to the database.

20. A method for securely processing data comprising the steps of:
receiving a data retrieval request;
obtaining authentication data;
wherein the authentication data is a second key value;
decrypting the second key value to obtain a corresponding second hash identifier stored in a second table;
matching the second hash identifier to a third hash identifier stored in a third table;
locating an encrypted context key value corresponding to the second hash identifier;
decrypting the encrypted context key value to obtain a context key value;
storing the context key value in temporary machine memory;
locating first hash identifiers corresponding to the context key value;
locating discrete components corresponding to each one of the first hash identifiers;
assembling the discrete components into context based on the context key value; and
returning the data to the database.

* * * * *